United States Patent [19]

Kesler et al.

[11] Patent Number: 5,036,594

[45] Date of Patent: Aug. 6, 1991

[54] METHOD AND APPARATUS FOR GAUGING THE CROSSLEVEL AND WARP OF RAILROAD TRACKS

[75] Inventors: John K. Kesler, Silver Spring, Md.; William L. Jordan, Washington, D.C.

[73] Assignee: Ensco, Inc., Springfield, Va.

[21] Appl. No.: 477,468

[22] Filed: Feb. 9, 1990

[51] Int. Cl.⁵ .................. E01B 35/02; G01C 9/00
[52] U.S. Cl. .................. 33/287; 33/338; 33/1 Q; 104/7.2
[58] Field of Search .............. 33/366, 338, 523.1, 33/1 Q, 287; 104/7.1, 7.2, 8; 318/649, 648; 340/689

[56] References Cited

U.S. PATENT DOCUMENTS

| | | | |
|---|---|---|---|
| 3,130,502 | 4/1964 | Stewart | 33/338 |
| 3,364,579 | 1/1968 | Fisher | 33/338 |
| 3,505,742 | 4/1970 | Fiechter | 33/338 |
| 3,594,912 | 7/1971 | Sauterel | 33/338 |
| 3,775,859 | 12/1973 | Sauterel | 33/338 |
| 3,835,546 | 9/1974 | Jaquet | 33/338 |
| 3,869,805 | 3/1975 | Dieringer | 33/338 |
| 4,538,061 | 8/1985 | Jaquet | 104/7.2 |
| 4,655,142 | 4/1987 | Theuner et al. | 104/7.1 |
| 4,673,854 | 6/1987 | Patton et al. | 33/338 |

*Primary Examiner*—William A. Cuchlinski, Jr.
*Assistant Examiner*—William C. Dowling
*Attorney, Agent, or Firm*—Sixbey, Friedman, Leedom & Ferguson

[57] ABSTRACT

The crosslevel measuring adapter includes a battery-powered electronic level sensor, a processor unit, a display, and data, display and power switches mounted in a housing through which an inclination measuring bar passes. The adapter unit may be mounted anywhere intermediate the ends of the bar which engage spaced railroad tracks during a measurement cycle. When the power switch is activated, the adapter initiates a zero mode to determine an automatic zero offset value to be automatically applied to subsequent crosslevel measurement values. The adapter calculates warp and crosslevel index values from a plurality of crosslevel measurements, and if the warp or crosslevel index values exceed respective threshold levels, automatic display of the value is initiated. Otherwise, measured crosslevel values are automatically displayed and calculated values are displayed by activation of the display switch.

32 Claims, 3 Drawing Sheets

000
METHOD AND APPARATUS FOR GAUGING THE CROSSLEVEL AND WARP OF RAILROAD TRACKS

The present invention includes an appendix.

TECHNICAL FIELD

The present invention relates to railroad track measuring methods and devices generally, and more particularly to an adapter designed to be mounted on an inclination measuring bar to provide automatic crosslevel, warp and harmonic crosslevel values (crosslevel index) when the bar is used for track measurement.

BACKGROUND OF THE ART

In recent years, significant advances have been made in the design of track measuring and gauging equipment for determining the condition of railroad tracks. Accurate optical gauging units employing laser technology have been developed which can be mounted upon a railroad car and propelled along the track to be inspected. These systems operate to accurately sense track defects, variations in track profile and other track irregularities which might result in a dangerous condition.

Systems have been developed to take crosslevel measurements across the rails of a track to detect relative level differences which might result in rocking and the ultimate derailment of a railroad car. A prior crosslevel measurement system is shown by Patton U.S. Pat. No. 4,673,854.

Even with the technological developments which have been made in track gauging methods and systems, the need still exists for a compact, portable apparatus which can be manually employed to obtain accurate crosslevel, warp and crosslevel index values for a length of railroad track.

DISCLOSURE OF THE INVENTION

It is a primary object of the present invention to provide a novel and improved crosslevel measuring adapter which will easily mount upon a inclination measuring bar adapted to rest upon and span a pair of railroad tracks. The adapter operates accurately when mounted at any point along the bar which is between the tracks.

Another object of the present invention is to provide a novel and improved crosslevel measuring adapter which is symmetrically designed so that the adapter components do not unbalance the inclination measuring bar upon which the adapter is mounted. The electrical components for the crosslevel measuring adapter are battery driven, and a pair of battery units are mounted in alignment to extend along opposite sides of the bar.

A further object of the present invention is to provide a novel, and improved crosslevel measuring adapter having a level sensing element which provides a sense signal indicative of a crosslevel value to a battery driven microprocessor. At the beginning of a measurement cycle, the microprocessor compares the first two crosslevel values taken to calculate a zero offset value which is then applied to all subsequent values obtained during the measurement cycle.

Yet another object of the present invention is to provide a novel and improved crosslevel measuring adapter which obtains and displays a crosslevel value when mounted on an inclination measuring bar which is brought into contact with a pair of rails spanned by the bar. The adapter further provides a warp value from a first number of successive crosslevel values and a crosslevel index value from a second greater number of crosslevel values.

A further object of the present invention is to provide a novel and improved crosslevel measuring adapter which obtains and normally automatically displays a crosslevel value. The adapter calculates a warp value and a crosslevel index value from successive crosslevel values and will automatically display a warp or value or crosslevel index value when such value exceeds a predetermined reference.

Another object of the present invention is to provide a novel and improved method for gauging the crosslevel and warp of a pair of rails which includes taking a plurality of crosslevel measurements, comparing a first number of successive crosslevel measurement values to obtain a maximum differential value between the crosslevel values in said first number of crosslevel measurement values and comparing the maximum differential value to a predetermined reference value to determine the relationship therebetween.

Yet a further object of the present invention is to provide a novel and improved method for gauging the crosslevel of railroad track which includes taking a plurality of crosslevel measurements at successive rail joints (normally 39 foot spacing and staggered left to right) and calculating the absolute difference in crosslevel between adjacent joints, summing said absolute difference values to obtain a total difference value and comparing said total difference value to a predetermined reference value to determine the relationship therebetween. The result approximates a calculation of the crosslevel index for the track which indicates the likelihood of a derailment due to harmonic car rocking.

Another object of the present invention is to provide a novel and improved method for gauging the crosslevel and warp of a railroad track which includes taking a plurality of crosslevel measurements to obtain a plurality of successive crosslevel measurement values, comparing a first number of successive crosslevel measurement values to obtain a maximum differential value between the crosslevel values in said first number of crosslevel measurements, comparing the maximum differential value to a first predetermined reference value to determine the relationship therebetween, obtaining an absolute difference between successive crosslevel measurement values for a second number of measurements which is greater than said first number but includes said first number, summing said absolute difference values to obtain a total difference value and comparing said total difference value to a second predetermined reference value to determine the relationship therebetween.

A still further object of the present invention is to provide a novel and improved method for gauging the crosslevel and warp of a railroad track which includes obtaining a first crosslevel value by measuring across said track in a first direction, obtaining a second crosslevel value by measuring across said track in a second direction opposite to said first direction at the spot where said first crosslevel value was obtained, combining said first and second crosslevel values to obtain either zero or a difference value as a zero offset value, taking a plurality of successive crosslevel measurements at different points along said pair of tracks to obtain a plurality of additional crosslevel measurement values, combining said zero offset value with each of said additional crosslevel measurement values to obtain a plurality of corrected crosslevel values, comparing a first number of successive corrected crosslevel values to obtain a maximum differential value between the corrected crosslevel values in said first number of corrected crosslevel values, comparing the maximum differential value to a first predetermined reference value to determine the relationship therebetween, obtaining an absolute difference between successive corrected crosslevel values for a second number of measurements which is greater than said first number but which includes said first number, summing said absolute difference values to obtain a total difference value and comparing said total difference value to a second predetermined reference value to determine the relationship therebetween.

BEST MODE FOR CARRYING OUT THE INVENTION

Figure 2:
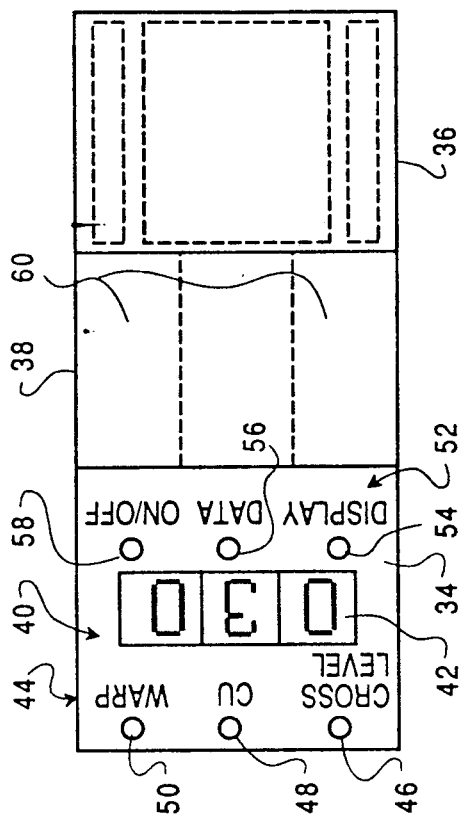
FIG. 2 is a plan view of the apparatus of FIG. 1.
Figure 3:
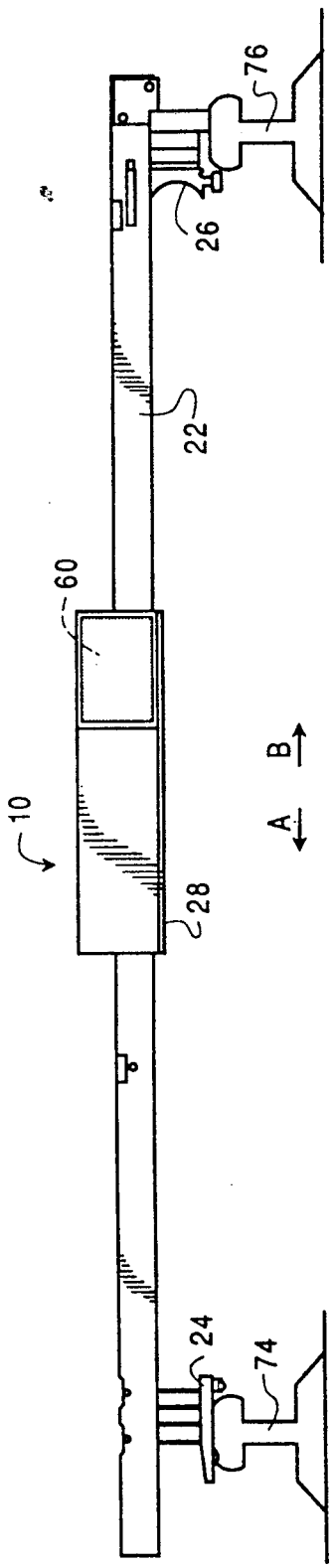
FIG. 3 is a view in side elevation of the apparatus of the present invention in place across a track pair.
Figure 1:
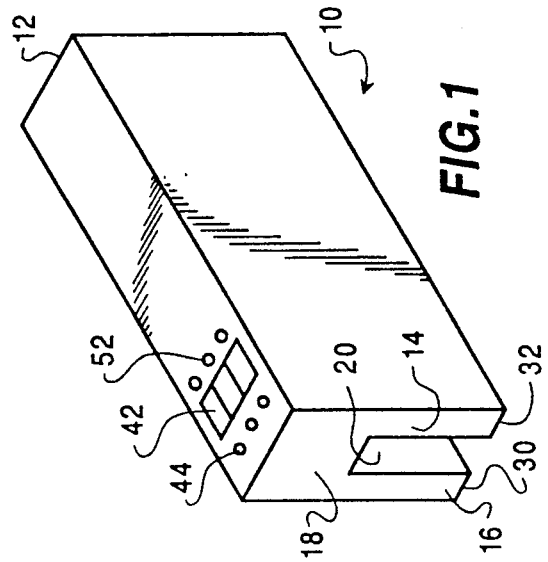
FIG. 1 is a perspective view of the apparatus for gauging the crosslevel and warp of railroad tracks of the present invention.

Referring now to FIGS. 1 and 2, the crosslevel measuring adapter of the present invention indicated generally at 10 has a housing 12 which is "U"-shaped in configuration. The housing includes two spaced, substantially parallel side compartments 14 and 16 which are joined by a top bridging compartment 18 so as to define a central opening 20 which extends longitudinally through the housing. In use, an inclination measuring bar 22 having track engaging plate assemblies 24 and 26 at opposite ends thereof extends through the central opening 20 as illustrated in FIG. 3. The crosslevel measuring adapter may be mounted at any point along the inclination measuring bar between the plate assemblies 24 and 26, and slips down over the bar so that the side compartments 14 and 16 extend along opposite sides of the bar while the top compartment 18 engages the top surface of the bar. Through bolts or other suitable means may be used to secure the housing 12 to the inclination measuring bar. For example, a removable base mounting plate 28 can be bolted to the bottom walls 30 and 32 of the side compartments 14 and 16 so as to extend across and close the central opening 20. This plate can be formed with mounting bolts, clamps or other means to secure the housing 12 to the inclination measuring bar.

The housing 12 includes two end sections 34 and 36 and a central section 38. The first end section 34 includes a display unit 40 having a numerical indicator 42 and indicator lights 44. The indicator lights comprise a crosslevel light 46, a crosslevel index light 48 and a warp light 50.

Also mounted in the end section 34 is a level sensing transducer assembly and unit control buttons 52. These unit control buttons include a display activating button 54, a data button 56 and an on/off switch 58.

The central section 38 carries the batteries 60 (shown in broken lines) for the crosslevel measuring adapter. These batteries are mounted in the side compartments 14 and 16 to evenly distribute the weight of the batteries at opposite sides of the crosslevel measuring adapter.

Figure 4:
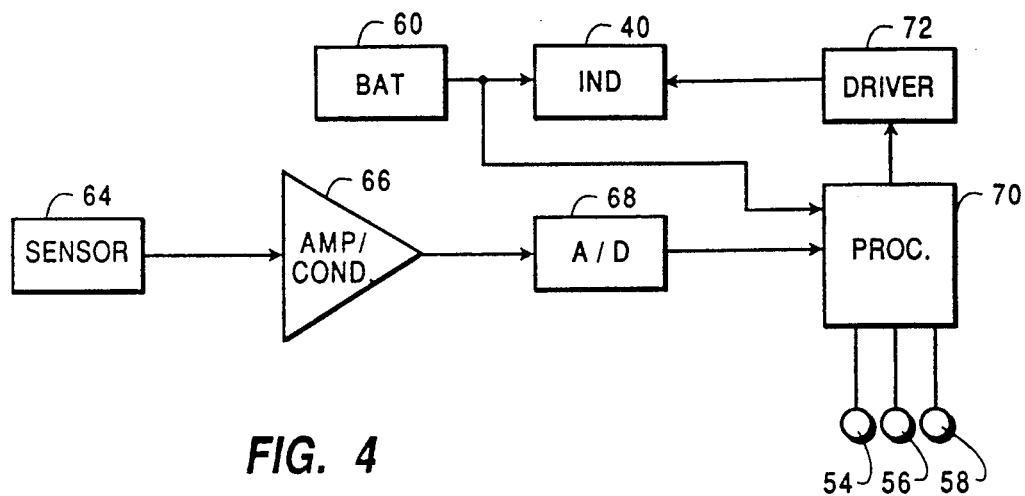
FIG. 4 is a block diagram of the circuit for the apparatus of FIG. 1.

Finally, the second end section 36 carries the microprocessor and circuit cards 62 for the crosslevel measuring adapter. These are connected to the display unit 40, the level sensing transducer assembly and the unit control buttons 52, and are powered by the batteries 60. As illustrated in FIG. 4, a level sensing transducer assembly 64 is connected to provide an analog signal having an amplitude indicative of a crosslevel value to an amplifier and signal conditioning circuit 66. The level sensing transducer may be one of several known level sensing units which include a pendulum or similar device to sense level changes and to provide an electrical output signal indicative thereof. One such unit is sold under the trademark ACCUSTAR by Shavitz.

The amplified output signal from the amplifier and signal conditioning circuit 66 is provided to an analog-to-digital converter 68 which in turn furnishes a digital signal which is a function of the analog signal value to a microprocessor 70. This microprocessor performs the calculations to be described in connection with FIGS. 5 and 6 and provides control outputs to the display unit 40 as well as indicated value outputs which are provided to the display unit via a display driver 72. Furthermore, the microprocessor includes conventional memory components for the storage of measurement values obtained by the crosslevel measuring adapter. Activation of the data button 56 causes the unit to register and process a crosslevel value sensed by the sensor 64.

The operation of the crosslevel measuring adapter 10 of the present invention will be clearly understood from a brief consideration of the broad method steps of the invention which the device is intended to perform. To initiate a measurement, the inclination measuring bar 22 is mounted upon tracks 74 and 76, as shown in FIG. 3. Since the device is used to measure inclination at joints in the tracks 74 and 76, the initial measurement is normally taken midway between track joints. The first measurement is taken with the unit oriented as shown in FIG. 3 in the direction of the arrow A, and subsequently the unit is reversed and oriented in the direction of the arrow B in FIG. 3 and a second measurement is taken. These first two measurements are then compared and ideally, the difference between the two would be zero. However, any actual difference which occurs is then stored and used as a zero offset to correct subsequent readings.

Once a zero offset is established, the inclination measuring bar is moved to the first track joint to be monitored and is then oriented in the direction indicated by the arrow A in FIG. 3, and one measurement is taken at each track joint as the device is moved along the track. The zero offset value is combined with each measurement to correct the measurement, and each of these corrected measurements constitutes a crosslevel value for the rails 74 and 76 at the joint where the measurement is taken.

After a specific number (X) of measurements are taken, a warp value is computed. Warp is the maximum difference between X number of crosslevel measurements, and generally warp would be the maximum difference between the last four crosslevel measurement values. Warp is compared to an allowable threshold value R1, and if warp is greater than this threshold value, an indication is given.

The taking of crosslevel measurements continues until a number Y, which is greater than X, is reached and at this point, a crosslevel index value is computed. The crosslevel index indicates the overall roughness of a track within the area where Y number of measurements are taken, and this index is indicative of the likelihood of a railway car rocking off the track. As a railway car proceeds down a length of track, it may initially encounter significant unevenness in the tracks at the joints, and if this unevenness immediately ceases, there may be no problem. However, the initial unevenness encountered will start the car rocking and once rocking occurs, subsequent track unevenness of a much less significant amplitude can cause the rocking to escalate until the car rocks off the tracks. Consequently, it is important to determine a crosslevel index value for a length of track and to compare this value with the threshold value to make sure that the overall length of track does not present a dangerous situation.

To obtain the crosslevel index value for a length of track, a greater number of crosslevel measurements are taken than are taken to determine warp. Generally, this number includes twelve crosslevel measurements, and an approximation of a root mean square value is obtained from these twelve measurements. The successive absolute difference between each of the twelve crosslevel values is calculated and the differences are summed. The sum of the differences is then compared to a reference value R2, and if the sum of these differences exceeds the reference value R2, then a crosslevel index indication is given. The reference value R1 for warp and the reference value R2 for the crosslevel index provide the limit for acceptable track inclination differentials, and beyond these limits, an unsatisfactory condition exists.

Figure 5:
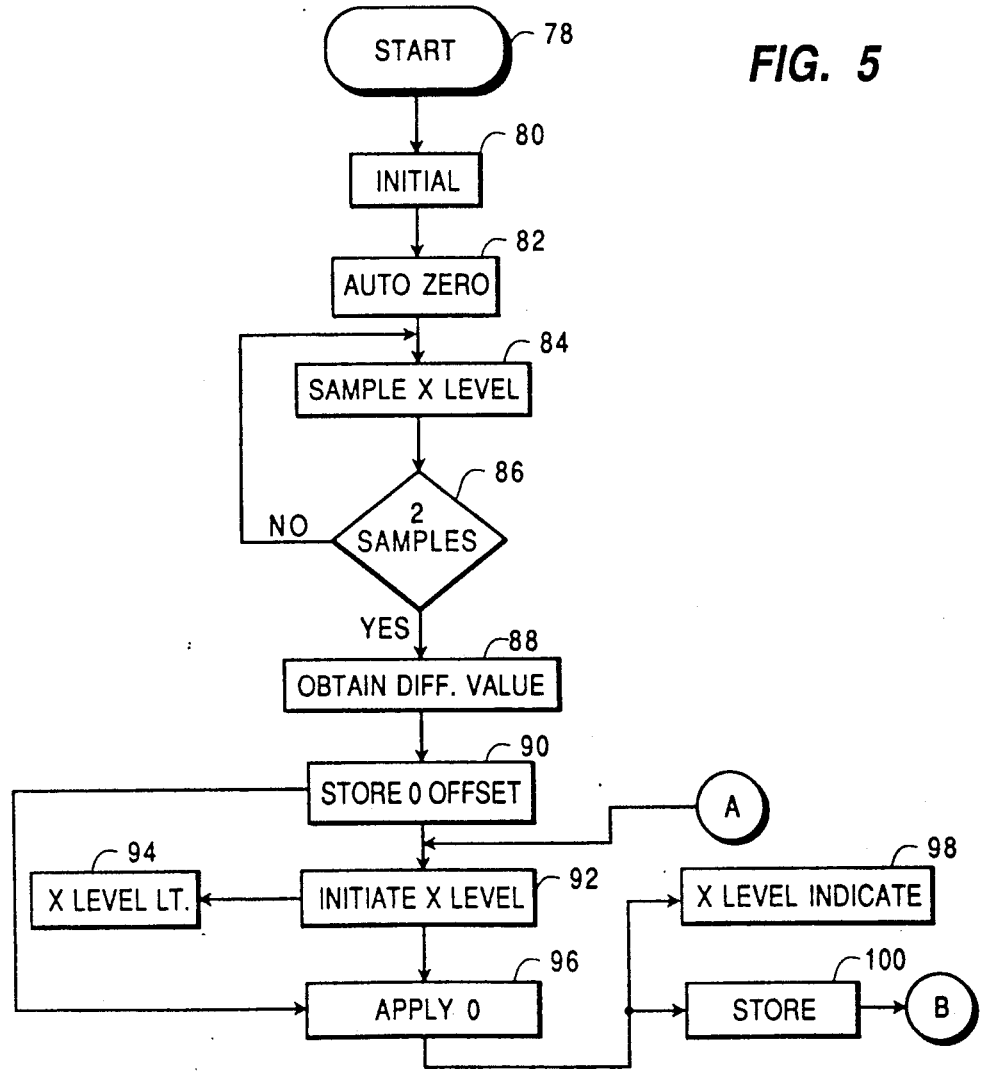
FIGS. 5 and 6 are a flow diagram illustrating the measurement operation of the apparatus of FIG. 1.
Figure 6:
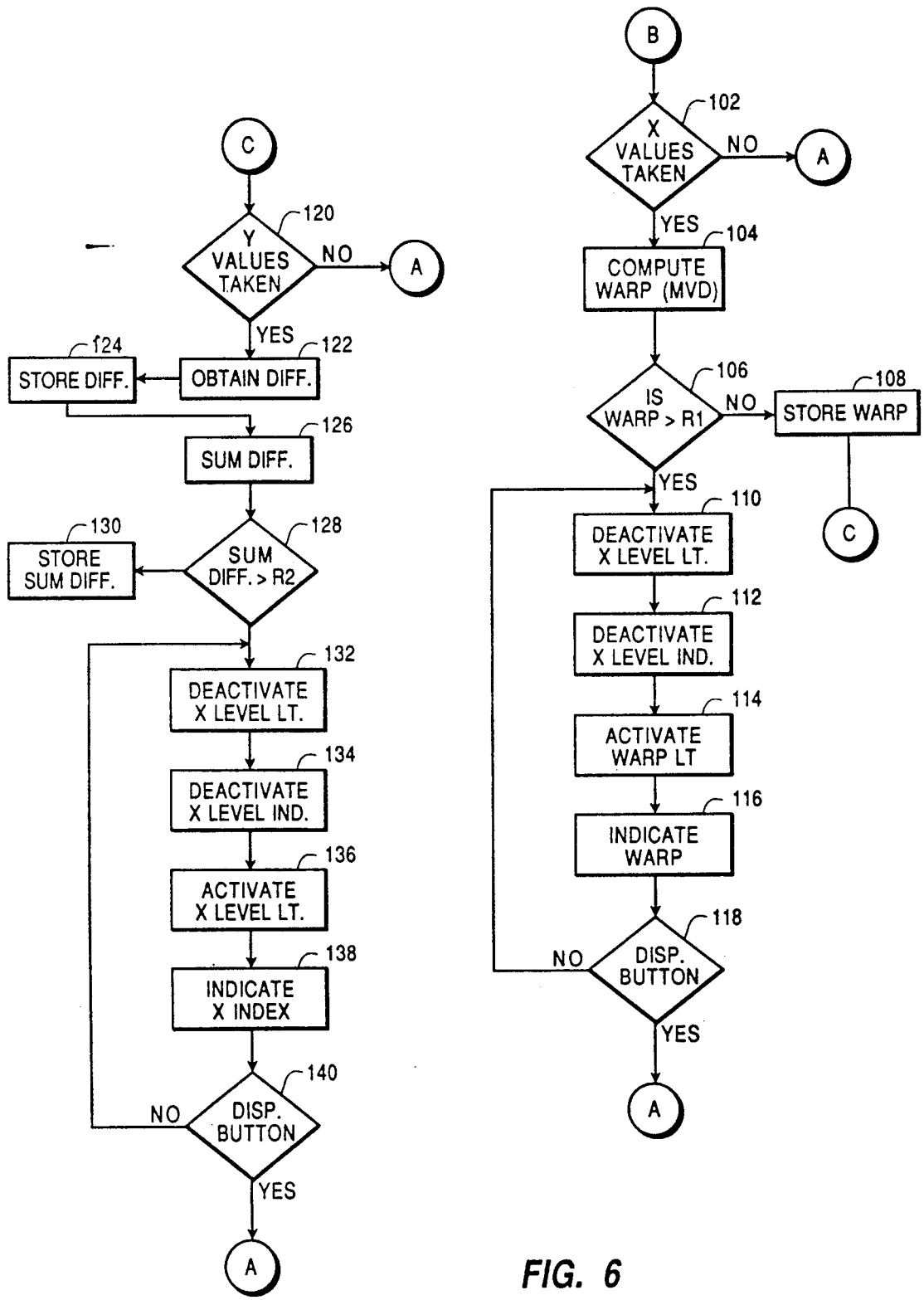

The general overall operation of the microprocessor 70 of FIG. 4 will best be understood with reference to the flow diagram of FIGS. 5 and 6. The operation of the crosslevel measuring adapter 10 is initiated by activating the on/off switch 58 to start the operation of the processor unit 70, as indicated at 78, and this triggers an initialization step 80. In the initialization state, the various components of the adapter 10 are automatically brought to an operating mode, with for example, the indicator 40 being activated while various control registers for the microprocessor unit 70 are reset to a desired state.

When the initialization operation is complete, an auto zero function is begun, as indicated at 82. During the auto zero period, the inclination measuring bar is subsequently oriented in the direction of the arrows A and B in FIG. 3, and a sample crosslevel measurement is obtained in each orientation as indicated at 84 by depressing the data button 56 for each measurement. When, as indicated at 86, two sample values have been obtained, the sample values are compared at 88 to obtain either zero or a difference value which is then stored as a zero offset at 90.

With the auto zero function completed, a crosslevel mode of operation is initiated at 92 and the crosslevel indicator light 46 is activated at 94. Now, as the inclination measuring bar 22 is moved down the track from joint to joint, a crosslevel measurement is taken at each joint and this measurement is automatically corrected by applying the zero offset thereto at 96. Then, at 98, each corrected crosslevel value is displayed by the numerical indicator 42 and is stored at 100.

Referring now to FIG. 6, the number of cross value measurements taken is sensed at 102, and when the number is greater than X, for example four measurements, then the maximum difference between any of the last four crosslevel measurements taken is determined at 104. This maximum difference value is compared at 106 with a threshold value R1, and if this maximum difference value is less than the threshold value R1, then the maximum difference value is stored as a warp value at 108. The warp value which is less than the threshold value is not automatically displayed on the numerical indicator 42, but the last stored warp value may be displayed on the indicator by pushing the display button 54 which also causes the warp light 50 to be illuminated. When the display button 54 is again activated, the last stored crosslevel will again be displayed and the crosslevel light 46 will light. When the maximum differential value exceeds the threshold R1, the crosslevel light 46 is deactivated at 110, the numerical indicator 42 is switched at 112 to remove the last crosslevel value indication, the warp light 50 is activated at 114, and the maximum differential value is indicated on the numerical indicator 42 as a warp value at 116. Thus, when the maximum differential value or warp exceeds the allowable threshold value, it is automatically displayed on the numerical indicator 42, but if the threshold is not exceeded, then the warp value is stored and the numerical indicator continues to automatically indicate the last crosslevel value. To remove the warp indication from the numerical display, the display button 54 is activated, and if this is sensed at 118, then the crosslevel measurement mode is reactivated and the last crosslevel measurement is again displayed.

When the number of crosslevel measurements equals a number Y, for example twelve measurements, this is sensed at 120 and the absolute differences between successive values is computed from the last twelve crosslevel measurement values, as indicated at 122 and stored at 124. These difference values are summed at 126, and at 128, the sum of the difference values is compared to a second threshold value R2. If this sum is less than the threshold value, it is stored as a crosslevel index value at 130. This stored crosslevel index value is not automatically displayed, but may be displayed by activating the display button 54.

If the sum of the difference values obtained exceeds the threshold value at 128, the crosslevel light 46 is deactivated at 132, the previous crosslevel indication on the numerical indicator 42 is cleared at 134, the crosslevel index light 46 is activated at 136, and the sum of the difference values is indicated on the numerical indicator 42 as a crosslevel index value at 138. Subsequently, if the display button 54 is activated, this is sensed at 140 and the system returns to the normal crosslevel measurement mode.

In summary, as long as the sensed warp value and the sensed crosslevel index value do not exceed the values of the first and second thresholds R1 and R2, respectively, then the numerical indicator 42 continues to indicate only the last crosslevel value measured. Of course, the last stored warp value at 108 and the last stored crosslevel index value at 130 can be displayed by activating the display button 54. Automatic display of these values occurs when they exceed the respective threshold values R1 and R2, and the display button 54 must then be activated to reinitiate the display of the last measured crosslevel value. The root mean square value computed at 122 may be an actual root mean square value or an approximation of the root mean square value. The approximation is obtained by obtaining a difference value between each successive cross-level measurement value in the Y number of measurements and the next preceding cross-level measurement value. When the Y number of measurements have occurred, these difference values are summed and used as the root mean square value for the subsequent calculations.

INDUSTRIAL APPLICABILITY

The method and apparatus for gauging crosslevel and warp of railroad track of the present invention may be effectively employed in a manual track gauging operation wherein measurements are manually taken at each joint in a track pair. The crosslevel measuring adaptor 10 is battery operated and may be mounted upon any suitable inclination measuring bar. The adaptor is symmetrical so as to not unbalance the bar on either side and possibly effect the measurements taken.

```
0003                    *VERSION 2 ADD WARP AND LCD DISPLAY
                        *CLI=CLI+ABS[JOINT(I)-JOINT(I+1)]
0004                    *CLI[SCALED OUT]= [CLI*12*.3]/[2*11*7.5]
0005                    *SCALING USED 255[FF]BYTES/15INCHES=17BYTES/INCH
0006                    *USES LOOK UP TABLE TO FIND CROSSLEVEL VALUE
0007                    *7.5INCHES/128=.058593750[.06]INCHES/BYTE
0008                    * -7.5 TO 7.44 INCHES
0009                    *ADD INTERUPT TO SELECT DISPLAY
0010                    *ADD BAT LOW INDICATION
0011                    *ADD AVG OF A/D SAMPLES
0012                    ******************************************************
0013 f800        START    EQU  $F800      LOAD ADDRESS FOR EEPROM
0014 0000        RAM      EQU  0          START ADRESS OF RAM
0015 00ff        STACK    EQU  $00FF      STACK POINTER START ADDRESS
0016 fffe                 ORG  $FFFE      RESET VECTOR ADDRESS
0017 fffe f8 00           FDB  START      LOAD REST VECTOR
0018                    *********LOOKUP TABLES FOR DISPLAYS*******************
0019 ffb0        LCD_CL   EQU  $FFB0
0020 ffb2        LCD_CLI  EQU  $FFB2
0021 ffb4        LCD_W    EQU  $FFB4
0022 ffb6        LCD_Z    EQU  $FFB6
0023 ffb8        POINT    EQU  $FFB8
0024 ffb0                 ORG  LCD_CL
0025 ffb0 fc 27           FDB  DIS_CL
0026 ffb2                 ORG  LCD_CLI
0027 ffb2 fc 2e           FDB  DIS_CLI
0028 ffb4                 ORG  LCD_W
0029 ffb4 fc 35           FDB  DIS_W
0030 ffb6                 ORG  LCD_Z
0031 ffb6 fc 3c           FDB  DIS_Z
0032 ffb8                 ORG  POINT
0033 ffb8 fc 43           FDB  CLEVEL
0034                    *******REGISTERS AND CONTROLL BITS*******************
0035 1039        OPTION   EQU  $1039      SYSTEM CONFIG OPTIONS ADDRESS[P 9-6]
0036 1007        DDRC     EQU  $1007      DATA DIRECTION PORT C ADDRESS
0037 1009        ·DDRD    EQU  $1009      DATA DIRECTION PORT D
0038             *PACTL   EQU  $1026          PULSE ACC CONTROL REG [DATA DIR BIT 7 PORTA]P 8-8
0039 1030        ADCTL    EQU  $1030      A/D CONTROLREGISTER
0040 1031        ADR1     EQU  $1031      A/D RESULT REGISTER 1
0041 1003        PORTC    EQU  $1003      I/O PORT C [PORT B $1004]
0042 1004        PORTB    EQU  $1004      I/O PORT B
0043 1000        PORTA    EQU  $1000      I/O PORT A
0044 1008        PORTD    EQU  $1008      I/O PORT D
0045                    *****DEFINITIONS*************************************
0046 00ff        PTCOUT   EQU  $FF        CODE PORT C AS OUTPUT [PORT B DEFAULT OUT]
0047 00ff        PTDOUT   EQU  $FF        CODE PORT D BITS 0-5 AS OUTPUT
0048             *PTAOUT  EQU  $00        CODE PORT A BIT 7 AS INPUT
0049 0090        CONFIG   EQU  %10010000  CODE TO SET UP CONFIG OPTION REG TURN A/D ON
0050 000c        JOINTS   EQU  $000C      NUMBER OF JOINTS
0051 0004        W_JOINTS EQU  $0004      NUMBER OF JOINTS FOR WARP
0052 0011        WARP_EX  EQU  $0011      WARP EXCEPTION VALUE (1 IN)
0053 00b0        CLI_EX   EQU  $00B0      CLI EXCEPTION VALUE  (.30)
```

```
0054 0020              STROBE    EQU $20        STROBE A/D TO SAMPLE
0055 0080              READAD    EQU $80        READ A/D
0056 0020              AVG_CT    EQU $20        # OF SAMPLES TO AVERAGE IN A/D
0057                   *****LCD DEFINITIONS********************************************
0058                   *PORT C
0059 0001              CLEAR_DIS EQU $01        CLEAR DISPLAY RETURN CURSOR TO HOME
0060 0002              HOME_CUR  EQU $02        SET DD RAM TO ZERO
0061 0006              ENTRY_MODE EQU $06       INC DD RAM WHEN CH WRITTEN
0062 000e              DISPLAY_ON EQU $0E       TURN DISPLAY ON, CURSOR OFF[0C]
0063 0008              DISPLAY_OFF EQU $08      TURN DISPLAY OFF
0064 0034              FUN_SET   EQU $34        8 BIT DATA,5*10 DOTS
0065 0080              DD_RAM    EQU $80
0066                   *PORT B
0067 0004              SET_INST  EQU $04
0068 0000              ENABLE_INST EQU $00
0069 0005              SET_DATA  EQU $05
0070 0001              ENABLE_DATA EQU $01
0071                   *******RAM*******************************************************
0072 0000              ORG RAM
0073 0000              STATUS    RMB 1          STAUTUS REG
0074                   *                         BIT      USE
0075                   *                         0        1=ZERO CODE
0076                   *                         1        1=CL
0077                   *                         2        1=WARP
0078                   *                         3        1=CLI
0079                   *                         4        1= REQUEST WARP AND CLI
0080                   *                         5        1= => 4 JOINTS
0081                   *                         6        1= => 12 JOINTS
0082                   *                         7        1=BATTERY LOW
0083 0001              ZERO      RMB 1          ZERO BAR VALUE[OFFSET FROM TRUE ZERO]
0084 0002              ZEROSN    RMB 1          ZERO VALUE SIGN [1=NEG]
0085 0003              ZEROCT    RMB 1          ZERO READING COUNT[2]
0086 0004              ZEROCP    RMB 1          ZERO COMPLETE [1=COMPLETE]
0087                   ***********ARRAY OF DATA TO OUTPUT TO LCD*****************
0088 0005              LCD_SIGN  RMB 1          SIGN OF LCD OR SPACE
0089 0006              DIGIT1    RMB 1          MS DIGITS OUT TO LCD
0090 0007              DEC_PT    RMB 1
0091 0008              DIGIT2    RMB 1          DIGIT LCD
0092 0009              DIGIT3    RMB 1          LS DIGIT LCD
0093 000a              SPACE1    RMB 1          SPACE
0094 000b              ZCT       RMB 1          ZERO COUNT
0095 000c              BAT       RMB 2          BATTERY LOW INDICATION
0096                   ****************************************************************
0097 000e              NEWJT     RMB 1          TEMP STORE FOR NEXT JT BEFOR MEM SHIFT
0098 000f              JOINT     RMB JOINTS     STORAGE FOR THE JOINTS
0099 001b              CLI       RMB 2          CLI VALUE[SUM OF ABS. DIFF.]
0100 001d              WARP      RMB 2          WARP
0101 001f              WARP_MAX  RMB 1
0102 0020              WARP_MIN  RMB 1
0103 0021              REG_Y     RMB 2          TEMP STORAGE FOR X AND Y REG
0104 0023              REG_X     RMB 2
0105 0025              X_REG     RMB 2
0106 0027              Y_REG     RMB 2
0107 0029              AVG       RMB 2          STORAGE FOR A/D AVG
0108 002b              ACOUNT    RMB 1          LOCATION FOR # OF SAMPLES IN AVG
0109 002c              TEMPST    RMB 1          TEMP STORE FOR TRANSFER
0110 002d              TEMPST1   RMB 1          TEMP STORE FOR LOOKUP TABLE
0111                   ****************************************************************
0112 f800              ORG START
0113 f800 c6 90        LDAB #CONFIG             SETS UP CONFIG. OPTION REG
0114 f802 f7 10 39     STAB OPTION
0115 f805 86 ff        LDAA #PTCOUT
0116 f807 b7 10 07     STAA DDRC                SET PORT C FOR OUTPUT
0117 f80a 8e 00 ff     LDS #STACK               SET STACK POINTER TO $FF
```

```
0118 f80d 86 ff                LDAA #PTDOUT
0119 f80f b7 10 09              STAA DDRD          SET PORT D BIT 0-3 FOR OUTPUT
0120                       *    LDAA #PTAOUT
0121                       *    STAA PACTL     SET PORT A BIT 7 FOR INPUT
0122 f812 7f 00 00              CLR STATUS         CLEAR STAUS STATUS
0123 f815 7f 00 01              CLR ZERO           CLEAR RAM LOC OF ZERO VALUE
0124 f818 7f 00 02              CLR ZEROSN         CLEAR RAM LOC OF ZEROSN
0125 f81b 7f 00 03              CLR ZEROCT         CLEAR RAM LOC OF READING NUMBER
0126 f81e 7f 00 04              CLR ZEROCP         CLEAR RAM LOC ZERO NOT DONE
0127 f821 86 20                 LDAA #$20
0128 f823 97 05                 STAA LCD_SIGN
0129 f825 97 0a                 STAA SPACE1
0130 f827 97 0b                 STAA ZCT
0131 f829 97 0c                 STAA BAT
0132 f82b 97 0d                 STAA BAT+1
0133 f82d 86 2e                 LDAA #$2E
0134 f82f 97 07                 STAA DEC_PT
0135 f831 86 00                 LDAA #$00          CLEAR OUTPUT ON PORT D
0136 f833 b7 10 08              STAA PORTD
0137                       *
0138 f836 86 01                 LDAA #CLEAR_DIS    INIT DISPLAY
0139 f838 bd fb 70              JSR LCD_INST
0140 f83b bd fc 0d              JSR WAIT2
0141 f83e 86 34                 LDAA #FUN_SET
0142 f840 bd fb 70              JSR LCD_INST
0143 f843 bd fc 0d              JSR WAIT2
0144 f846 86 0e                 LDAA #DISPLAY_ON
0145 f848 bd fb 70              JSR LCD_INST
0146 f84b 86 06                 LDAA #ENTRY_MODE
0147 f84d bd fb 70              JSR LCD_INST
0148 f850 bd fc 0d              JSR WAIT2
0149                       ****************ZEROING CODE*********************************
0150 f853 7c 00 00              INC STATUS         TYRN ON ZERO BIT IN STATUS
0151 f856 86 31                 LDAA #$31
0152 f858 97 0b                 STAA ZCT
0153 f85a bd f9 eb      SAMP    JSR AD             JUMP TO A/D
0154 f85d 96 2c                 LDAA TEMPST        RECALL VALUE FROM TEMPST
0155 f85f 0c                    CLC                CLEAR CARRY BIT
0156 f860 9b 01                 ADDA ZERO          ADD MEMORY LOC 00 TO READING
0157 f862 97 01                 STAA ZERO          STORE READING
0158 f864 7c 00 03              INC ZEROCT         AND ONE TO ZEROCT
0159 f867 7c 00 0b              INC ZCT
0160 f86a c6 01                 LDAB #$01          LOAD A WITH $01 TO AND WITH ZEROCT
0161 f86c d4 03                 ANDB ZEROCT        TO CHECK FOR TWO SAMPLES TAKEN
0162 f86e 26 ea                 BNE SAMP           BRANCH BACK TO A/D IF ZEROCT < 2
0163 f870 46                    RORA               ROTATE RIGHT [DEVIDE BY TWO]
0164 f871 97 2c                 STAA TEMPST        STORE ZERO BAR VALUE IN TEMPST
0165 f873 c6 80                 LDAB #$80          LOAD B IDEAL ZERO VALUE
0166 f875 d1 2c                 CMPB TEMPST        COMPARE WITH ZERO VALUE
0167 f877 27 0e                 BEQ EQUAL          IF = BRANCH TO EQUAL
0168 f879 96 2c                 LDAA TEMPST        LOAD A WITH ZERO VALUE
0169 f87b 10                    SBA                ZERO VALUE - $80
0170 f87c 2a 0f                 BPL GREATER        IF POS BRANCH TO GREATER
0171 f87e d6 2c                 LDAB TEMPST        LOAD B WITH ZERO VALUE
0172 f880 86 80                 LDAA #$80
0173 f882 10                    SBA                $80-ZERO VALUE
0174 f883 97 01                 STAA ZERO          STORE ZERO OFFSET IN ZERO
0175 f885 20 0b                 BRA END
0176 f887 86 00      EQUAL      LDAA #$00          STORE 0 ZERO OFFSET IN ZERO
0177 f889 97 01                 STAA ZERO
0178 f88b 20 05                 BRA END
0179 f88d 97 01      GREATER    STAA ZERO          STORE ZERO OFFSET IN ZERO
0180 f88f 7c 00 02              INC ZEROSN         CHANGE SIGN OFF ZERO OFFSET TO NEG
```

```
0181 f892 7c 00 04        END      INC ZEROCP        SET ZEROCP TO DONE
0182 f895 7f 00 00                 CLR STATUS        TURN OFF ZERO BIT IN STATUS
0183 f898 86 20                    LDAA #$20
0184 f89a 97 0b                    STAA ZCT
0185                      *******************END OF ZEROING CODE*************************************
0186                      ****************START OF CROSSLEVEL INDEX AND WARP**************************
0187                      ********************FIRST 12 JOINTS [4JOINTS]*******************************
0188 f89c 96 00                    LDAA STATUS
0189 f89e 8b 02                    ADDA #$02         TURN ON XL STATUS BIT
0190 f8a0 97 00                    STAA STATUS
0191 f8a2 18 ce 00 1a              LDY #JOINTS+#JOINT-1   LOAD Y POINTER WITH LOC OF 1ST JOINT
0192 f8a6 bd f9 eb        NJOINT   JSR AD
0193 f8a9 96 2c                    LDAA TEMPST       LOAD A WITH VALUE FROM A/D
0194 f8ab 18 a7 00                 STAA ,Y           STORE VALUE
0195 f8ae 18 09                    DEY               MOVE POINTER
0196 f8b0 18 8c 00 16              CPY #JOINT+#JOINTS-#W_JOINTS-#1
0197 f8b4 22 09                    BHI CONT
0198 f8b6 96 00                    LDAA STATUS       TURN ON STATUS BIT 5  4 JOINTS OR MORE
0199 f8b8 8a 20                    ORA #%00100000
0200 f8ba 97 00                    STAA STATUS
0201 f8bc bd f9 58                 JSR WARP_CAL
0202 f8bf 18 8c 00 0e     CONT     CPY #JOINT-1
0203 f8c3 26 e1                    BNE NJOINT        IF NOT EQUAL TO ZERO BRANCH TO JOINT[NEXT]
0204 f8c5 86 40                    LDAA #%01000000   SET STATUS BIT 6 ON
0205 f8c7 9a 00                    ORAA STATUS
0206 f8c9 97 00                    STAA STATUS
0207 f8cb bd f8 f4                 JSR CLI_CAL
0208                      ********************ADDITIONAL JOINTS AND ONWARD****************************
0209 f8ce bd f9 eb        N_JOINT  JSR AD
0210 f8d1 7f 00 0e                 CLR NEWJT         CLEAR FOR SHIFT
0211 f8d4 96 2c                    LDAA TEMPST       GET VALUE OF NEXT JOINT
0212 f8d6 97 0e                    STAA NEWJT        STORE THAT VALUE
0213 f8d8 18 ce 00 1a              LDY #JOINTS+#JOINT-1   SET Y POINTER
0214 f8dc ce 00 19                 LDX #JOINTS+#JOINT-2   SET X POINTER TO 7TH JOINT
0215 f8df a6 00           SHIFT    LDAA $00,X        MOVE JOINTS IN MEMORY
0216 f8e1 18 a7 00                 STAA $00,Y
0217 f8e4 09                       DEX
0218 f8e5 18 09                    DEY
0219 f8e7 8c 00 0d                 CPX #NEWJT-1
0220 f8ea 26 f3                    BNE SHIFT
0221 f8ec bd f9 58                 JSR WARP_CAL
0222 f8ef bd f8 f4                 JSR CLI_CAL
0223 f8f2 20 da                    BRA N_JOINT
0224                      *************************CLI CALCULATION************************************
0225 f8f4             CLI_CAL  EQU *
0226 f8f4 96 00                    LDAA STATUS
0227 f8f6 8a 08                    ORA #%00001000    TURN ON CLI STATUS BIT
0228 f8f8 97 00                    STAA STATUS
0229 f8fa ce 00 0f        RECAL    LDX #JOINT        LOAD JOINT POINTER OFFSET
0230 f8fd 7f 00 1b                 CLR CLI           CLEAR CLI
0231 f900 7f 00 1c                 CLR CLI+$1
0232 f903 a6 00           ADD      LDAA $00,X        LOAD 1ST JOINT IN A
0233 f905 e6 01                    LDAB $01,X        LOAD 2ND JOINT IN B
0234 f907 e1 00                    CMPB $00,X        COMPARE THE JOINTS
0235 f909 25 03                    BLO SUB1          BRANCH IF A>B
0236 f90b 16                       TAB               IF B>A TRANSFER A TO B
0237 f90c a6 01                    LDAA $01,X        AND LOAD 2ND JOINT IN A
0238 f90e 10              SUB1     SBA               FIND ABSOLUTE DIFF.
0239 f90f 16                       TAB               TRANSFER A TO B AND
0240 f910 4f                       CLRA              CLEAR A TO POSISTION NUMBER
```

```
0241 f911 d3 1b              ADDD CLI          ADD TO CLI
0242 f913 dd 1b              STD CLI           STORE CLI
0243 f915 08                 INX
0244 f916 8c 00 1a           CPX #JOINTS+JOINT-1 CHECK FOR LAST JOINT
0245 f919 26 e8              BNE ADD           IF NOT GO TO NEXT
0246 f91b 96 00              LDAA STATUS
0247 f91d 84 10              ANDA #%00010000
0248 f91f 26 08              BNE CLI7
0249 f921 dc 1b              LDD CLI
0250 f923 1a 83 00 b0        CPD #CLI_EX       IS CLI LESS THAN EXCEPTION LIMIT
0251 f927 25 28              BLO CLI6          YES BRANCH
0252 f929 86 30         CLI7 LDAA #$30
0253 f92b 97 06              STAA DIGIT1
0254 f92d 97 08              STAA DIGIT2
0255 f92f 97 09              STAA DIGIT3
0256 f931 dc 1b              LDD CLI
0257 f933 c3 ff b5      CLI1 ADDD #$FFB5      FIRST DIGIT OF CLI[-75]
0258 f936 25 02              BCS CLI2
0259 f938 2b 05              BMI CLI3
0260 f93a 7c 00 08      CLI2 INC DIGIT2
0261 f93d 20 f4              BRA CLI1
0262 f93f cb 4b         CLI3 ADDB #$4B        [+75]
0263 f941 cb f8         CLI4 ADDB #$F8        SECOND DIGIT OF CLI[-8]
0264 f943 2b 05              BMI CLI5
0265 f945 7c 00 09           INC DIGIT3
0266 f948 20 f7              BRA CLI4
0267 f94a 86 20         CLI5 LDAA #$20        TURN OFF SIGN (+/-)
0268 f94c 97 05              STAA LCD_SIGN
0269 f94e bd fb 14           JSR OUT
0270 f951 96 00         CLI6 LDAA STATUS
0271 f953 84 f7              ANDA #%11110111  TURN OFF CLI STATUS BIT
0272 f955 97 00              STAA STATUS
0273 f957 39                 RTS
0274                  *********************WARP CALCULATION********************************
0275 f958               WARP_CAL EQU *
0276 f958 7f 00 1d           CLR WARP
0277 f95b 7f 00 1e           CLR WARP+1
0278 f95e 86 30              LDAA #$30
0279 f960 97 06              STAA DIGIT1       INIT DIGITS
0280 f962 97 08              STAA DIGIT2
0281 f964 97 09              STAA DIGIT3
0282 f966 96 00              LDAA STATUS
0283 f968 8a 04              ORA #%00000100    TURN ON WARP STATUS BIT
0284 f96a 97 00              STAA STATUS
0285 f96c 84 40              ANDA #%01000000   HAVE 12 JOINTS BEEN ENTERED
0286 f96e 26 07              BNE WARP1
0287 f970 18 df 27           STY Y_REG
0288 f973 18 08              INY
0289 f975 20 04              BRA WARP2
0290 f977 18 ce 00 0f  WARP1 LDY #JOINT
0291 f97b ce 00 00     WARP2 LDX #$0000
0292 f97e 18 a6 00           LDAA ,Y
0293 f981 97 1f              STAA WARP_MAX
0294 f983 97 20              STAA WARP_MIN
0295 f985 18 08        WARP3 INY
0296 f987 08                 INX
0297 f988 18 a6 00           LDAA ,Y
0298 f98b 91 1f              CMPA WARP_MAX
0299 f98d 22 08              BHI NEW_MAX
0300 f98f 91 20              CMPA WARP_MIN
```

```
0301 f991 24 06                      BHS WARP4
0302 f993 97 20                      STAA WARP_MIN
0303 f995 20 02                      BRA WARP4
0304 f997 97 1f      NEW_MAX         STAA WARP_MAX
0305 f999 8c 00 03   WARP4           CPX #W_JOINTS-1
0306 f99c 26 e7                      BNE WARP3
0307 f99e 96 1f                      LDAA WARP_MAX
0308 f9a0 d6 20                      LDAB WARP_MIN
0309 f9a2 10                         SBA
0310 f9a3 97 1e                STAA WARP+1        SAVE WARP
0311 f9a5 96 00                      LDAA STATUS
0312 f9a7 84 10                      ANDA #%00010000
0313 f9a9 26 06                      BNE WARP8
0314 f9ab 96 1e                      LDAA WARP+1
0315 f9ad 81 11                      CMPA #WARP_EX      IS WARP LESS THEN EXCEPTION LIMIT
0316 f9af 25 30                      BLO WARP7          YES BRANCH
0317 f9b1 dc 1d      WARP8           LDD WARP           LOAD WARP FOR DIV
0318 f9b3 ce 00 11                   LDX #$0011         LOAD $11(17)
0319 f9b6 02                         IDIV               DIV BY 17
0320 f9b7 8f                         XGDX               EXCHANGE X AND D REG
0321 f9b8 db 06                      ADDB DIGIT1
0322 f9ba d7 06                      STAB DIGIT1
0323 f9bc c6 06                      LDAB #$06
0324 f9be 8c 00 00   WARP5           CPX #$0000
0325 f9c1 27 05                      BEQ WARP6
0326 f9c3 1b                         ABA
0327 f9c4 19                         DAA
0328 f9c5 09                         DEX
0329 f9c6 20 f6                      BRA WARP5
0330 f9c8 97 2d      WARP6           STAA TEMPST1
0331 f9ca 84 0f                      ANDA #%00001111
0332 f9cc 9b 09                      ADDA DIGIT3
0333 f9ce 97 09                      STAA DIGIT3
0334 f9d0 96 2d                      LDAA TEMPST1
0335 f9d2 44                         LSRA
0336 f9d3 44                         LSRA
0337 f9d4 44                         LSRA
0338 f9d5 44                         LSRA
0339 f9d6 9b 08                      ADDA DIGIT2
0340 f9d8 97 08                      STAA DIGIT2
0341 f9da 86 20                      LDAA #$20
0342 f9dc 97 05                      STAA LCD_SIGN
0343 f9de bd fb 14                   JSR OUT
0344 f9e1 96 00      WARP7           LDAA STATUS
0345 f9e3 84 fb                      ANDA #%11111011    TURN OFF WARP STATUS BIT
0346 f9e5 97 00                      STAA STATUS
0347 f9e7 18 de 27                   LDY Y_REG
0348 f9ea 39                         RTS
0349                 *****************A/D CONVERTION*****************************************
0350 f9eb            AD              EQU *
0351 f9eb 18 df 21   AD1             STY REG_Y
0352 f9ee 7f 00 2c   SAMPLE          CLR TEMPST         TEMP STOREAGE LOCATION
0353 f9f1 7f 00 29                   CLR AVG            LOCATION OF SAMPLES TO BE AVG
0354 f9f4 7f 00 2a                   CLR AVG+1
0355 f9f7 86 20                      LDAA #AVG_CT       # OF SAMPLES TO BE AVG
0356 f9f9 97 2b                      STAA ACOUNT
0357 f9fb 86 20      STRO            LDAA #STROBE       LOADA TO STROBE A/D TO SAMPLE
0358 f9fd b7 10 30                   STAA ADCTL         WRITE A/D TO SAMPLE
0359 fa00 86 80      READ            LDAA #READAD       READ A/D
0360 fa02 b4 10 30                   ANDA ADCTL         AND A/D FOR COMPLETIONS OF CONV[BIT 7]
```

```
0361 fa05 27 f9                BEQ READ          IF EQUAL TO ZERO BRANCH TO READ A/D FOR COMP[-7]
0362 fa07 f6 10 31              LDAB ADR1         LADD A WITH VALUE OF ADR1
0363 fa0a 4f          CLRA
0364 fa0b d3 29       ADDD AVG
0365 fa0d dd 29       STD AVG
0366 fa0f 7a 00 2b    DEC ACOUNT
0367 fa12 26 e7       BNE STRO
0368 fa14 dc 29       LDD AVG
0369 fa16 04          LSRD
0370 fa17 04          LSRD
0371 fa18 04          LSRD
0372 fa19 04          LSRD
0373 fa1a 04          LSRD
0374 fa1b d7 2c                 STAB TEMPST       STORE A LOC 02
0375 fa1d bd fa 5e              JSR SCALE         ADJUST VALUE FOR ZERO VALUE
0376 fa20 bd fa 8a              JSR BCD
0377 fa23 bd fb 14              JSR OUT           JUMP TO DISPLAY PROGRAM
0378 fa26 86 02                 LDAA #%00000010   TEST FOR REQUEST DISPLAY
0379 fa28 b4 10 00              ANDA PORTA
0380 fa2b 27 06                 BEQ AD2           IF NO REQUEST BRANCH
0381 fa2d 18 de 21              LDY REG_Y
0382 fa30 bd fb c1              JSR SERVICE
0383 fa33 86 04       AD2       LDAA #%00000100   LOAD A WITH VALUE TO TEST FOR BAT LOW
0384 fa35 b4 10 00              ANDA PORTA
0385 fa38 27 07                 BEQ AD3           IF NO BRANCH
0386 fa3a cc 42 4c              LDD #$424C        SET LCD POS 15 AND 16 BL
0387 fa3d dd 0c                 STD BAT
0388 fa3f 20 05                 BRA AD4
0389 fa41 cc 20 20    AD3       LDD #$2020        SET LCD POS 15 AND 16 BLANK
0390 fa44 dd 0c                 STD BAT
0391 fa46 86 01       AD4       LDAA #%00000001   LOAD A WITH VALUE TO TEST FOR ACCEPT
0392 fa48 b4 10 00              ANDA PORTA        AND A WITH VALUE OF PORT A
0393 fa4b 27 a1                 BEQ SAMPLE        IF NO BRANCH BACK TO A/D TO SAMPLE
0394 fa4d bd fb f3              JSR LOOP          WAIT FOR SW BOUNCE ECT
0395 fa50 86 01                 LDAA #$01         LOAD A WITH VALUE FOR SW =0
0396 fa52 b4 10 00    TEST      ANDA $1000        CHECK TO SEE IF FINGER OFF BUTTON
0397 fa55 26 fb                 BNE TEST
0398 fa57 bd fb f3              JSR LOOP          WAIT FOR SW BOUNCE ECT
0399 fa5a 18 de 21              LDY REG_Y
0400 fa5d 39                    RTS
0401                  ***************ADJUST A/D READING FOR ZERO VALUE**************
0402 fa5e             SCALE     EQU *             ZERO CORRECTION
0403 fa5e 7d 00 04              TST ZEROCP        TEST ZERO COMPLETE BIT IF NOT DONE
0404 fa61 27 26                 BEQ RET1          RETURN
0405 fa63 7d 00 02              TST ZEROSN        TEST FOR DIRECTION OF ZERO SHIFT
0406 fa66 26 0a                 BNE SCALE1
0407 fa68 96 01                 LDAA ZERO         LOAD A WITH ZERO VALUE[2 COMP]
0408 fa6a 9b 2c                 ADDA TEMPST       SUBTRACT ZERO FROM READING
0409 fa6c 25 11                 BCS SCALE2        IF CARRY SET BRANCH TO OVER
0410 fa6e 97 2c                 STAA TEMPST
0411 fa70 20 17                 BRA RET1
0412 fa72 96 2c       SCALE1    LDAA TEMPST
0413 fa74 d6 01                 LDAB ZERO
0414 fa76 d1 2c                 CMPB TEMPST
0415 fa78 24 0b                 BHS SCALE3
0416 fa7a 10                    SBA
0417 fa7b 97 2c                 STAA TEMPST
0418 fa7d 20 0a                 BRA RET1
0419 fa7f 86 ff       SCALE2    LDAA #$FF         IF CARRY SET, SET JOINT VALUE TO
0420 fa81 97 2c                 STAA TEMPST       FULLSCALE, +7IN. AND STORE
```

```
0421 fa83 20 04                BRA RET1
0422 fa85 86 00     SCALE3     LDAA #$00         IF NEG. SET JOINT VALUE TO MINIMUM
0423 fa87 97 2c                STAA TEMPST       VALUE -7IN. AND STORE
0424 fa89 39        RET1       RTS
0425                ************CONVERT 8BIT BINARY TO LCD FORMAT***************************
0426 fa8a           BCD        EQU *             CONVERT 8BIT BINARY NUMBER TO BCD SCALED
0427                *                            VOLTAGE
0428 fa8a 86 30                LDAA #$30         SET DIGITS TO BASE VALUE (0) FOR LCD
0429 fa8c 97 06                STAA DIGIT1       LOC OF FIRST NUMBER, MS
0430 fa8e 97 08                STAA DIGIT2
0431 fa90 97 09                STAA DIGIT3       THIRD DIGIT, LS
0432 fa92 96 2c                LDAA TEMPST       LOAD VALUE TO CONVERT IN A
0433 fa94 97 2d                STAA TEMPST1
0434 fa96 7d 00 04             TST ZEROCP        IF ZEROCP=1 BRANCH TO INCH
0435 fa99 26 30                BNE INCH
0436 fa9b 0c        VOLT       CLC               CLEAR CARRY BIT
0437 fa9c 8b cc                ADDA #$CC         ADD -52 [WAS-51 CD]
0438 fa9e 25 02                BCS VOLT1         IF CARRY BIT SET VALUE IS NOT NEG.
0439 faa0 2b 05                BMI VOLT2         BRANCH TO NEXT DIGIT IF NEG
0440 faa2 7c 00 06  VOLT1      INC DIGIT1        ADD ONE TO DIGIT1
0441 faa5 20 f4                BRA VOLT          BRANCH TO ADD -51[-9]
0442 faa7 01        VOLT2      NOP
0443 faa8 8b 33                ADDA #51          ADD 50 TO A
0444 faaa 2b 67                BMI RET           IF NEG BRANCH TO RETURN [RTS] [14]
0445 faac 8b fb     VOLT3      ADDA #$FB         ADD -5
0446 faae 2b 05                BMI VOLT4         BRANCH TO NEXT DIGIT IF NEGTIVE
0447 fab0 7c 00 08             INC DIGIT2        ADD ONE TO DIGIT2
0448 fab3 20 f7                BRA VOLT3         BRANCH BACK TO ADD -5[-9]
0449 fab5 d6 08     VOLT4      LDAB DIGIT2
0450 fab7 c1 3a                CMPB #$3A
0451 fab9 26 07                BNE VOLT5
0452 fabb c6 30                LDAB #$30
0453 fabd d7 08                STAB DIGIT2
0454 fabf 7c 00 06             INC DIGIT1
0455 fac2 8b 05     VOLT5      ADDA #5           ADD 5 TO A
0456 fac4 48                   ASLA              SHIFT A LEFT, MULTIPLY BY 2
0457 fac5 9b 09                ADDA DIGIT3       ADD DIGIT3
0458 fac7 97 09                STAA DIGIT3       STORE LSB AT DIGIT3
0459 fac9 20 48                BRA RET           END OF VOLTAGE TO BCD
0460 facb c6 80     INCH       LDAB #$80         CL=0
0461 facd d1 2d                CMPB TEMPST1      COMPARE WITH JOINT
0462 facf 27 36                BEQ INCH3         IF TEMPST=$80 THEN CL=0
0463 fad1 25 06                BLO INCH1         IF TEMPST>$80 THEN CL=POS
0464 fad3 c6 2d                LDAB #$2D         TURN ON NEG SIGN
0465 fad5 d7 05                STAB LCD_SIGN
0466 fad7 20 07                BRA INCH2
0467 fad9 70 00 2d  INCH1      NEG TEMPST1       TWOS COMP IF POS CL
0468 fadc c6 2b                LDAB #$2B         TURN ON POS SIGN
0469 fade d7 05                STAB LCD_SIGN
0470 fae0 fe ff b8  INCH2      LDX POINT         POINT TO START OF LOOKUP TABLE
0471 fae3 d6 2d                LDAB TEMPST1
0472 fae5 db 2d                ADDB TEMPST1
0473 fae7 3a                   ABX               MOVE POINTER
0474 fae8 a6 00                LDAA $00,X        GET LED12 VALUE FROM TABLE
0475 faea 97 2d                STAA TEMPST1
0476 faec 84 0f                ANDA #%00001111   GET DIGIT2
0477 faee 9b 08                ADDA DIGIT2
0478 faf0 97 08                STAA DIGIT2
0479 faf2 96 2d                LDAA TEMPST1
0480 faf4 44                   LSRA              GET DIGIT1
```

```
****************LCD HEADER********************************
0546
0547 fb7e              LCD_HEAD  EQU *
0548 fb7e df 25                  STX  X_REG
0549 fb80 dc 25                  LDD  X_REG
0550 fb82 c3 00 06               ADDD #$06
0551 fb85 dd 25                  STD  X_REG
0552 fb87 c6 05       HEAD1      LDAB #SET_DATA
0553 fb89 a6 00                  LDAA ,X
0554 fb8b fd 10 03               STD  PORTC
0555 fb8e bd fc 00               JSR  WAIT
0556 fb91 c6 01                  LDAB #ENABLE_DATA
0557 fb93 f7 10 04               STAB PORTB
0558 fb96 9c 25                  CPX  X_REG
0559 fb98 27 03                  BEQ  HEAD2
0560 fb9a 08                     INX
0561 fb9b 20 ea                  BRA  HEAD1
0562 fb9d 39          HEAD2      RTS
0563
***************LCD DATA**********************************
0564 fb9e              LCD_DATA  EQU *
0565 fb9e ce 00 05               LDX  #LCD_SIGN
0566 fba1 df 25                  STX  X_REG
0567 fba3 dc 25                  LDD  X_REG
0568 fba5 c3 00 08               ADDD #$08
0569 fba8 dd 25                  STD  X_REG
0570 fbaa c6 05       DATA1      LDAB #SET_DATA
0571 fbac a6 00                  LDAA ,X
0572 fbae fd 10 03               STD  PORTC
0573 fbb1 bd fc 00               JSR  WAIT
0574 fbb4 c6 01                  LDAB #ENABLE_DATA
0575 fbb6 f7 10 04               STAB PORTB
0576 fbb9 9c 25                  CPX  X_REG
0577 fbbb 27 03                  BEQ  DATA2
0578 fbbd 08                     INX
0579 fbbe 20 ea                  BRA  DATA1
0580 fbc0 39          DATA2      RTS
************SERVICE REQUEST FOR DISPLAY******************
0581
0582 fbc1              SERVICE   EQU *
0583 fbc1 96 00                  LDAA STATUS
0584 fbc3 8a 10                  ORA  #%00010000
0585 fbc5 97 00                  STAA STATUS
0586 fbc7 84 20                  ANDA #%00100000
0587 fbc9 27 12                  BEQ  SER5
0588 fbcb bd fb e7                JSR  RESET_FF
0589 fbce 18 de 21                LDY  REG_Y
0590 fbd1 bd f9 58   SER1        JSR  WARP_CAL
0591 fbd4 86 40                  LDAA #%01000000
0592 fbd6 94 00                  ANDA STATUS
0593 fbd8 27 03                  BEQ  SER5
0594 fbda bd f8 f4   SER2        JSR  CLI_CAL
0595 fbdd bd fb e7   SER5        JSR  RESET_FF
0596 fbe0 96 00                  LDAA STATUS
0597 fbe2 84 ef                  ANDA #%11101111
0598 fbe4 97 00                  STAA STATUS
0599 fbe6 39                     RTS
***************RESET FLIP FLOP***************************
0600
0601 fbe7              RESET_FF  EQU *
0602 fbe7 8d 0a                  BSR  LOOP
0603 fbe9 86 01                  LDAA #$01
0604 fbeb b7 10 08                STAA PORTD
0605 fbee 4a                     DECA
0606 fbef b7 10 08                STAA PORTD
0607 fbf2 39                     RTS
***************DELAY FOR SWITCH BOUNCE********************
0608
0609 fbf3              LOOP      EQU *
```

```
0481 faf5 44                    LSRA
0482 faf6 44                    LSRA
0483 faf7 44                    LSRA
0484 faf8 9b 06                 ADDA DIGIT1
0485 fafa 97 06                 STAA DIGIT1
0486 fafc c6 01                 LDAB #$01
0487 fafe 3a                    ABX              MOVE POINTER
0488 faff a6 00                 LDAA $00,X       GET LED3 VALUE FROM TABLE
0489 fb01 9b 09                 ADDA DIGIT3
0490 fb03 97 09                 STAA DIGIT3
0491 fb05 20 0c                 BRA RET
0492 fb07 86 30      INCH3      LDAA #$30        IF CL=0
0493 fb09 97 06                 STAA DIGIT1
0494 fb0b 97 08                 STAA DIGIT2
0495 fb0d 97 09                 STAA DIGIT3
0496 fb0f 86 20                 LDAA #$20
0497 fb11 97 05                 STAA LCD_SIGN
0498 fb13 39        RET         RTS
0499                ******************OUT TO LCD SORT OF*********************************
0500 fb14           OUT         EQU *
0501 fb14 86 80                 LDAA #DD_RAM     HOME_CUR
0502 fb16 bd fb 70              JSR LCD_INST
0503 fb19 86 01                 LDAA #%00000001
0504 fb1b 94 00                 ANDA STATUS
0505 fb1d 27 0b                 BEQ OUT1
0506 fb1f fe ff b6              LDX LCD_Z
0507 fb22 bd fb 7e              JSR LCD_HEAD
0508 fb25 bd fb 9e              JSR LCD_DATA
0509 fb28 20 45                 BRA OUT4
0510 fb2a 86 04     OUT1        LDAA #%00000100
0511 fb2c 94 00                 ANDA STATUS
0512 fb2e 27 18                 BEQ OUT2
0513 fb30 fe ff b4              LDX LCD_W
0514 fb33 bd fb 7e              JSR LCD_HEAD
0515 fb36 bd fb 9e              JSR LCD_DATA
0516 fb39 bd fc 1a  OUT5        JSR WAIT3
0517 fb3c 86 02                 LDAA #$02
0518 fb3e b4 10 00              ANDA PORTA
0519 fb41 27 f6                 BEQ OUT5
0520 fb43 bd fb e7              JSR RESET_FF
0521 fb46 20 27                 BRA OUT4
0522 fb48 86 08     OUT2        LDAA #%00001000
0523 fb4a 94 00                 ANDA STATUS
0524 fb4c 27 18                 BEQ OUT3
0525 fb4e fe ff b2              LDX LCD_CLI
0526 fb51 bd fb 7e              JSR LCD_HEAD
0527 fb54 bd fb 9e              JSR LCD_DATA
0528 fb57 bd fc 1a  OUT6        JSR WAIT3
0529 fb5a 86 02                 LDAA #$02
0530 fb5c b4 10 00              ANDA PORTA
0531 fb5f 27 f6                 BEQ OUT6
0532 fb61 bd fb e7              JSR RESET_FF
0533 fb64 20 09                 BRA OUT4
0534 fb66 fe ff b0  OUT3        LDX LCD_CL
0535 fb69 bd fb 7e              JSR LCD_HEAD
0536 fb6c bd fb 9e              JSR LCD_DATA
0537 fb6f 39        OUT4        RTS
0538                ******************LCD INSTRUCTION*************************************
0539 fb70           LCD_INST    EQU *
0540 fb70 c6 04                 LDAB #SET_INST
0541 fb72 fd 10 03              STD PORTC
0542 fb75 bd fc 00              JSR WAIT
0543 fb78 c6 00                 LDAB #ENABLE_INST
0544 fb7a f7 10 04              STAB PORTB
0545 fb7d 39                    RTS
```

```
0610 fbf3 18 ce 00 ff              LDY  #$00FF
0611 fbf7 18 09          LOOP1     DEY
0612 fbf9 18 8c 00 00              CPY  #$00
0613 fbfd 26 f8                    BNE  LOOP1
0614 fbff 39                       RTS
0615                     *************SHORT DELAY FOR LCD********************************
0616 fc00                WAIT      EQU  *            DELAY FOR DISPLAY
0617 fc00 18 ce 00 20              LDY  #$0020
0618 fc04 18 09          WAIT_1    DEY
0619 fc06 18 8c 00 00              CPY  #$00
0620 fc0a 26 f8                    BNE  WAIT_1
0621 fc0c 39                       RTS
0622                     ***************LONG DELAY FOR LCD***************************
0623 fc0d                WAIT2     EQU  *            DELAY FOR DISPLAY
0624 fc0d 18 ce 00 90              LDY  #$0090
0625 fc11 18 09          WAIT2_1   DEY
0626 fc13 18 8c 00 00              CPY  #$00
0627 fc17 26 f8                    BNE  WAIT2_1
0628 fc19 39                       RTS
0629                     *************LONGER DELAY FOR LCD*****************************
0630 fc1a                WAIT3     EQU  *
0631 fc1a 18 ce ff ff              LDY  #$FFFF
0632 fc1e 18 09          WAIT3_1   DEY
0633 fc20 18 8c 00 00              CPY  #$0000
0634 fc24 26 f8                    BNE  WAIT3_1
0635 fc26 39                       RTS
0636                     ****************LCD LOOKUP TABLES******************************
0637 fc27 58 4c 45 56 45 4c   DIS_CL    FCB  $58,$4C,$45,$56,$45,$4C,$20
     20
0638 fc2e 20 20 43 4c 49 20   DIS_CLI   FCB  $20,$20,$43,$4C,$49,$20,$20
     20
0639 fc35 20 57 41 52 50 20   DIS_W     FCB  $20,$57,$41,$52,$50,$20,$20
     20
0640 fc3c 20 5a 45 52 4f 20   DIS_Z     FCB  $20,$5A,$45,$52,$4F,$20,$20
     20
0641                     *************************************************************
0642 fc43 75 00 74 04 73 08   CLEVEL   fcb  $75,00,$74,04,$73,08,$73,02,$72,07,$72,01,$71,05,$70,09
     73 02 72 07 72 01
     71 05 70 09
0643 fc53 70 03 69 07 69 01            fcb  $70,03,$69,07,$69,01,$68,06,$68,00,$67,04,$66,08,$66,02
     68 06 68 00 67 04
     66 08 66 02
0644 fc63 65 06 65 00 64 05            fcb  $65,06,$65,00,$64,05,$63,09,$63,03,$62,07,$62,01,$61,05
     63 09 63 03 62 07
     62 01 61 05
0645 fc73 60 09 60 04 59 08            fcb  $60,09,$60,04,$59,08,$59,02,$58,06,$58,00,$57,04,$56,08
     59 02 58 06 58 00
     57 04 56 08
0646 fc83 56 03 55 07 55 01            fcb  $56,03,$55,07,$55,01,$54,05,$53,09,$53,03,$52,07,$52,01
     54 05 53 09 53 03
     52 07 52 01
0647 fc93 51 06 51 00 50 04            fcb  $51,06,$51,00,$50,04,$49,08,$49,02,$48,06,$48,00,$47,05
     49 08 49 02 48 06
     48 00 47 05
0648 fca3 46 09 46 03 45 07            fcb  $46,09,$46,03,$45,07,$45,01,$44,05,$43,09,$43,04,$42,08
     45 01 44 05 43 09
     43 04 42 08
0649 fcb3 42 02 41 06 41 00            fcb  $42,02,$41,06,$41,00,$40,04,$39,08,$39,03,$38,07,$38,01
     40 04 39 08 39 03
     38 07 38 01
```

```
0650 fcc3 37 05 36 09 36 03          fcb $37,05,$36,09,$36,03,$35,07,$35,02,$34,06,$34,00,$33,04
     35 07 35 02 34 06
     34 00 33 04
0651 fcd3 32 08 32 02 31 06          fcb $32,08,$32,02,$31,06,$31,01,$30,05,$29,09,$29,03,$28,07
     31 01 30 05 29 09
     29 03 28 07
0652 fce3 28 01 27 05 27 00          fcb $28,01,$27,05,$27,00,$26,04,$25,08,$25,02,$24,06,$24,00
     26 04 25 08 25 02
     24 06 24 00
0653 fcf3 23 04 22 09 22 03          fcb $23,04,$22,09,$22,03,$21,07,$21,01,$20,05,$19,09,$19,03
     21 07 21 01 20 05
     19 09 19 03
0654 fd03 18 08 18 02 17 06          fcb $18,08,$18,02,$17,06,$17,00,$16,04,$15,08,$15,02,$14,06
     17 00 16 04 15 08
     15 02 14 06
0655 fd13 14 01 13 05 12 09          fcb $14,01,$13,05,$12,09,$12,03,$11,07,$11,01,$10,05,$10,00
     12 03 11 07 11 01
     10 05 10 00
0656 fd23 09 04 08 08 08 02          fcb $09,04,$08,08,$08,02,$07,06,$07,00,$06,04,$05,09,$05,03
     07 06 07 00 06 04
     05 09 05 03
0657 fd33 04 07 04 01 03 05          fcb $04,07,$04,01,$03,05,$02,09,$02,03,$01,08,$01,02,$00,06
     02 09 02 03 01 08
     01 02 00 06
0658                                  fcb $04,07,$04,01,$03,05,$02,09,$02,03,$01,08,$01,02,$00,06
```

We claim:

1. A method for gauging the crosslevel and warp of a pair of railroad track by measuring the inclination between adjacent points on the surfaces of the two rails as a crosslevel measurement which includes taking a plurality of successive crosslevel measurements across said track at spaced points along the length of said tracks to obtain a first number of crosslevel measurement values, comparing said first number of crosslevel measurement values to obtain a warp value which is a function of the maximum differential between the crosslevel values in said first number of crosslevel values and comparing the warp value to a predetermined allowable warp reference value to determine which is greater.

2. The method of claim 1, wherein said first number of crosslevel measurement values are obtained by taking four successive crosslevel measurements.

3. The method of claim 1, which includes providing an indication when said warp value exceeds said predetermined allowable warp reference value.

4. The method of claim 1 which includes obtaining a zero reference value before taking said plurality of successive crosslevel measurements by taking at least a first crosslevel measurement across said tracks in a first direction, subsequently taking at least a second crosslevel measurement across said tracks in the same place where said first crosslevel measurement was taken but in a second direction which is opposite to said first direction, obtaining a difference value from said first and second crosslevel measurements, and applying said difference value as a zero offset reference to subsequently obtained crosslevel measurement values.

5. The method of claim 1 which includes continuing to take a plurality of crosslevel measurements after said first number of crosslevel values is obtained until a second number of crosslevel values has been obtained which includes and is greater than said first number of crosslevel values, obtaining an absolute difference value between each successive crosslevel value in said second number of crosslevel values, summing said absolute difference values to obtain a total difference value indicative of the crosslevel index and comparing said crosslevel index to a second predetermined allowable cross level reference value to determine which is greater.

6. The method of claim 5 which includes providing an indication when said crosslevel index exceeds said second predetermined allowable crosslevel reference value.

7. The method of claim 5, wherein said second number of crosslevel measurement values is obtained by taking a total of twelve successive crosslevel measurements.

8. The method of claim 5 which includes obtaining a zero reference value before taking said plurality of successive crosslevel measurements by taking at least a first crosslevel measurement across said track in a first direction, subsequently taking at least a second crosslevel measurement across said track in the same place where said first crosslevel measurement was taken but in a second direction which is opposite to said first direction, obtaining a difference value from said first and second crosslevel measurements, and applying said difference value as a zero offset reference to subsequently obtained crosslevel measurement values.

9. A method for gauging the crosslevel index of a railroad track by measuring the inclination between adjacent points on the surfaces of the two rails as a crosslevel measurement which includes taking a plurality of successive crosslevel measurements across said rails at spaced points along the length of said track to obtain a first number of crosslevel measurement values, obtaining an absolute difference value between successive crosslevel measurement values, and summing said absolute difference values to obtain a total difference value indicative of the crosslevel index.

10. The method of claim 9 which includes obtaining a zero reference value before taking said plurality of successive crosslevel measurements by taking at least a first crosslevel measurement across said tracks in a first direction, subsequently taking at least a second crosslevel measurement across said tracks in the same place where said first crosslevel measurement was taken but in a second direction which is opposite to said first direction, obtaining a difference value from said first and second crosslevel measurements, and applying said difference value as a zero offset reference to subsequently obtained crosslevel measurement values.

11. The method of claim 10, wherein said first number of crosslevel measurement values is obtained by taking twelve successive crosslevel measurements.

12. The method of claim 9 which includes comparing said total difference value to a second reference value to determine which is greater.

13. The method of claim 12 which includes providing an indication when said total difference value exceeds said second predetermined reference value.

14. A crosslevel measuring adapter for attachment to an inclination measuring bar to gauge the crosslevel, warp and crosslevel index of a railroad track by measuring the inclination between adjacent points on the surfaces of the two rails as a crosslevel measurement comprising a housing, an inclination sensing means mounted within said housing, said inclination sensing means operating to provide a measurement signal having a value indicative of the amplitude of inclination sensed by said inclination sensing means, processing means connected to receive said measurement signal and indicator means connected to said processing means and operative to display values in response to output signals from said processing means, said processing means causing said indicator means to normally automatically display a crosslevel value in response to each measurement signal received by said processing means which is a function of said measurement signal value, said processing means further operating upon the receipt thereby of a first number of measurement signals to compare said first number of measurement signals to obtain a maximum differential value indicative of the maximum differential between the values of the individual measurement signals in said first number of measurement signals and to subsequently compare said maximum differential value to a first reference value.

15. The crosslevel measuring adapter of claim 14, wherein a display control means is connected to said processing means, said display control means being operative when activated to cause said processing means to change the value displayed by said indicator means.

16. The crosslevel measuring adapter of claim 15, wherein said indicator means is operative to display a crosslevel value, a warp value and a crosslevel index value, said processing means causing said indicator means to normally display a crosslevel value automatically, the processing means normally operating to cause said indicator means to display warp values and crosslevel index values in response to activation of said display control means.

17. The crosslevel measuring adapter of claim 16, wherein a warp value displayed by said indicator means is a function of said maximum differential value.

18. The crosslevel measuring adapter of claim 17, wherein said processing means operates when said maximum differential value exceeds said second reference value to cause said indicator means to automatically display a warp value which is a function of the maximum differential value which exceeds said first reference value.

19. The crosslevel measuring adapter of claim 14, wherein said processing means operates after the receipt thereby of said first number of measurement signals and upon receipt of a second number of measurement signals which includes and is greater than said first number of measurement signals to obtain absolute differences between successive values of said second number of measurement signals, to sum said absolute difference values to obtain a total difference value and to compare said total difference value to a second reference value.

20. The crosslevel measuring adapter of claim 19, wherein said processor means operates to cause said indicator means to automatically display a crosslevel index value which is a function of said total difference value when said total difference value exceeds said second reference value.

21. The crosslevel measuring adapter of claim 20, wherein a display control means is connected to said processing means, said display control means being operative when activated to cause said processing means to change the value displayed by said indicator means.

22. The crosslevel measuring adapter of claim 21, wherein said indicator means is operative to display a crosslevel value, a warp value and a crosslevel index value, said processing means causing said indicator means to normally display a crosslevel value automatically, the processing means normally operating to cause said indicator means to display warp values and crosslevel index values in response to activation of said display control means.

23. The crosslevel measuring adapter of claim 22, wherein a warp value displayed by said indicator means is a function of said maximum differential value.

24. The crosslevel measuring adapter of claim 23, wherein said processing means operates when said maximum differential value exceeds said second reference value to cause said indicator means to automatically display a warp value which is a function of the maximum differential value which exceeds said first reference value.

25. The crosslevel measuring adapter of claim 24, wherein said housing means includes a central opening extending longitudinally therethrough to receive said inclination measuring bar and battery receiving chambers extending on opposite sides of said central opening.

26. A crosslevel measuring adapter for attachment to an inclination measuring bar to gauge the crosslevel, warp and crosslevel index of a pair of railroad tracks by measuring the inclination between adjacent points on the surfaces of the two tracks as a crosslevel measurement comprising a housing, an inclination sensing means mounted within said housing, said inclination sensing means operating to provide a measurement signal having a value indicative of the amplitude of inclination sensed by said inclination sensing means, processing means connected to receive said measurement signal and indicator means connected to said processing means and operative to display values in response to output signals from said processing means, said processing means operating upon the receipt thereby of a first number of measurement signals to obtain an absolute difference between adjacent measurements, and to then sum said absolute difference values to obtain a total difference value as a crosslevel index value for display by said indicator means.

27. The crosslevel measuring adapter of claim 26, wherein said processing means operates to cause said indicator means to display successive crosslevel values, each of which is a function of a measurement signal value received by said processing means.

28. The crosslevel measuring adapter of claim 27, wherein a display control means is connected to said processing means, said display control means being operative when activated to cause said processing means to change the value displayed by said indicator means.

29. The crosslevel measuring adapter of claim 28, wherein said processing means causes said indicator means to normally automatically display said crosslevel values, the processing means normally operating to cause said indicator means to display a crosslevel index value in response to activation of said display control means.

30. The crosslevel measuring adapter of claim 29, wherein said processing means operates to compare said total difference value with a first reference value, said processing means operating when said total difference value exceeds said first reference value to cause said indicator means to display the crosslevel index value indicative of said total difference value without activation of said display control means.

31. The crosslevel measuring adapter of claim 26, wherein said processing means operates to compare at least the first and second measurement signal values received thereby to obtain an offset difference value therefrom, said processing means operating to apply said offset difference value as a correction value to each subsequent measurement signal value as a zero correction.

32. The crosslevel measuring adapter of claim 31, wherein said processing means operates upon the receipt thereby of a second number of measurement signals which is less than said first number of measurement signals to compare said second number of measurement signals to obtain a maximum differential value indicative of the maximum differential between the values of the individual measurement signals in said second number of measurement signals as a warp value for display by said indicator means.

* * * * *